US 10,694,845 B2

(12) United States Patent
Mill

(10) Patent No.: US 10,694,845 B2
(45) Date of Patent: Jun. 30, 2020

(54) GRILL INSERT ENCLOSURE

(71) Applicant: Mill Brothers Landscape & Nursery, Inc., Fort Collins, CO (US)

(72) Inventor: Andrew W. Mill, Timnath, CO (US)

(73) Assignee: Mill Brothers Landscape & Nursery, Inc., Fort Collins, CO (US)

( * ) Notice: Subject to any disclaimer, the term of this patent is extended or adjusted under 35 U.S.C. 154(b) by 871 days.

(21) Appl. No.: 15/206,135

(22) Filed: Jul. 8, 2016

(65) Prior Publication Data

US 2018/0010808 A1 Jan. 11, 2018

(51) Int. Cl.
| *B60Q 1/26* | (2006.01) |
| *A47B 77/02* | (2006.01) |
| *A47B 88/40* | (2017.01) |
| *A47J 37/07* | (2006.01) |
| *F24C 15/08* | (2006.01) |
| *F24C 15/00* | (2006.01) |

(52) U.S. Cl.
CPC ............. *A47B 77/02* (2013.01); *A47B 88/40* (2017.01); *A47J 37/0786* (2013.01); *F24C 15/007* (2013.01); *F24C 15/08* (2013.01)

(58) Field of Classification Search
CPC ................................ A47B 77/02; A47B 88/40
USPC ................... 126/41 R, 41 D, 40, 39 B, 37 R; 312/265.4
See application file for complete search history.

(56) References Cited

U.S. PATENT DOCUMENTS

| 1,018,636 | A |   | 2/1912  | Shults |
|-----------|---|---|---------|--------|
| 2,476,756 | A | * | 7/1949  | Mosher .................. F24C 15/10 126/211 |
| 2,855,260 | A | * | 10/1958 | Reiss ..................... A47B 47/03 211/186 |
| 3,087,768 | A | * | 4/1963  | Mack .................. A47B 47/0008 312/263 |
| 3,176,677 | A | * | 4/1965  | McArthur, Jr. ......... F24C 15/08 126/214 A |
| 3,275,394 | A | * | 9/1966  | Massinger ............. A47B 47/03 312/265.4 |
| 3,391,682 | A | * | 7/1968  | King .................... A47J 37/0704 126/25 R |
| 4,117,783 | A |   | 10/1978 | Eckel et al. |
| 4,677,964 | A | * | 7/1987  | Lohmeyer ........... A47J 37/0713 126/41 R |
| 4,787,319 | A |   | 11/1988 | Dupraz |
| 4,946,050 | A |   | 8/1990  | Akopiantz |
| D316,355  | S | * | 4/1991  | Stephen ............... A47J 37/0704 D7/334 |
| 5,027,718 | A |   | 7/1991  | Graham, Sr. |
| 5,050,577 | A | * | 9/1991  | Baynes ............... A47J 37/0713 126/41 R |
| 5,140,973 | A | * | 8/1992  | Home ................. A47J 37/0786 108/64 |
| 5,228,762 | A | * | 7/1993  | Mascrier .................. H02B 1/01 312/265.1 |

(Continued)

*Primary Examiner* — Avinash A Savani
(74) *Attorney, Agent, or Firm* — Craig R. Miles; CR Miles P.C.

(57) ABSTRACT

A grill insert enclosure including a framework of interconnected frame members and support members adapted to receive a grill insert. The construction and utilization of the grill insert enclosure includes adjustably locating the support members to accommodate the configuration and dimensions of various grill inserts.

19 Claims, 9 Drawing Sheets

(56) References Cited

U.S. PATENT DOCUMENTS

| | | | | |
|---|---|---|---|---|
| 5,527,103 A * | 6/1996 | Pittman | A01K 63/006 | |
| | | | 217/12 R | |
| 5,713,651 A * | 2/1998 | Essig | F16B 12/50 | |
| | | | 312/265.4 | |
| D395,378 S * | 6/1998 | Schlosser | D7/334 | |
| 5,806,946 A * | 9/1998 | Benner | H05K 7/183 | |
| | | | 312/265.3 | |
| 5,941,229 A * | 8/1999 | Schlosser | A47J 37/0786 | |
| | | | 126/25 R | |
| 6,099,095 A | 8/2000 | Irace | | |
| 6,439,220 B1 * | 8/2002 | Johnson | A47J 37/0781 | |
| | | | 126/25 R | |
| 6,619,600 B1 * | 9/2003 | Johnson | A47J 37/0704 | |
| | | | 126/25 R | |
| 6,739,330 B1 * | 5/2004 | Ross | A47J 37/0781 | |
| | | | 126/37 R | |
| 6,805,113 B2 * | 10/2004 | Stephen | A47J 37/0786 | |
| | | | 126/25 R | |
| 6,925,998 B2 * | 8/2005 | Bruno | A47J 37/0704 | |
| | | | 126/25 R | |
| 7,273,261 B2 * | 9/2007 | DeMars | A47F 9/00 | |
| | | | 108/115 | |
| 7,328,696 B2 * | 2/2008 | Rodriguez | A47J 37/0704 | |
| | | | 126/30 | |
| 7,810,486 B2 | 10/2010 | Bruno et al. | | |
| 7,913,681 B2 * | 3/2011 | Choi | A47J 37/0786 | |
| | | | 126/25 R | |
| 8,465,031 B2 * | 6/2013 | Coghill, Jr. | B62B 1/14 | |
| | | | 280/47.35 | |
| 8,511,293 B2 | 8/2013 | Thompson et al. | | |
| 9,526,375 B2 * | 12/2016 | Chang | A47J 37/0713 | |
| 10,001,154 B2 * | 6/2018 | Chang | F16B 5/02 | |
| 2003/0213484 A1 * | 11/2003 | Alden | A47J 37/0713 | |
| | | | 126/41 R | |
| 2005/0127802 A1 * | 6/2005 | Chen | A47B 57/36 | |
| | | | 312/265.4 | |
| 2005/0133018 A1 * | 6/2005 | Spangrud | A47J 37/0713 | |
| | | | 126/41 R | |
| 2007/0246035 A1 * | 10/2007 | Chen | A47J 37/0704 | |
| | | | 126/41 R | |
| 2014/0041556 A1 | 2/2014 | Diepenbrock | | |

* cited by examiner

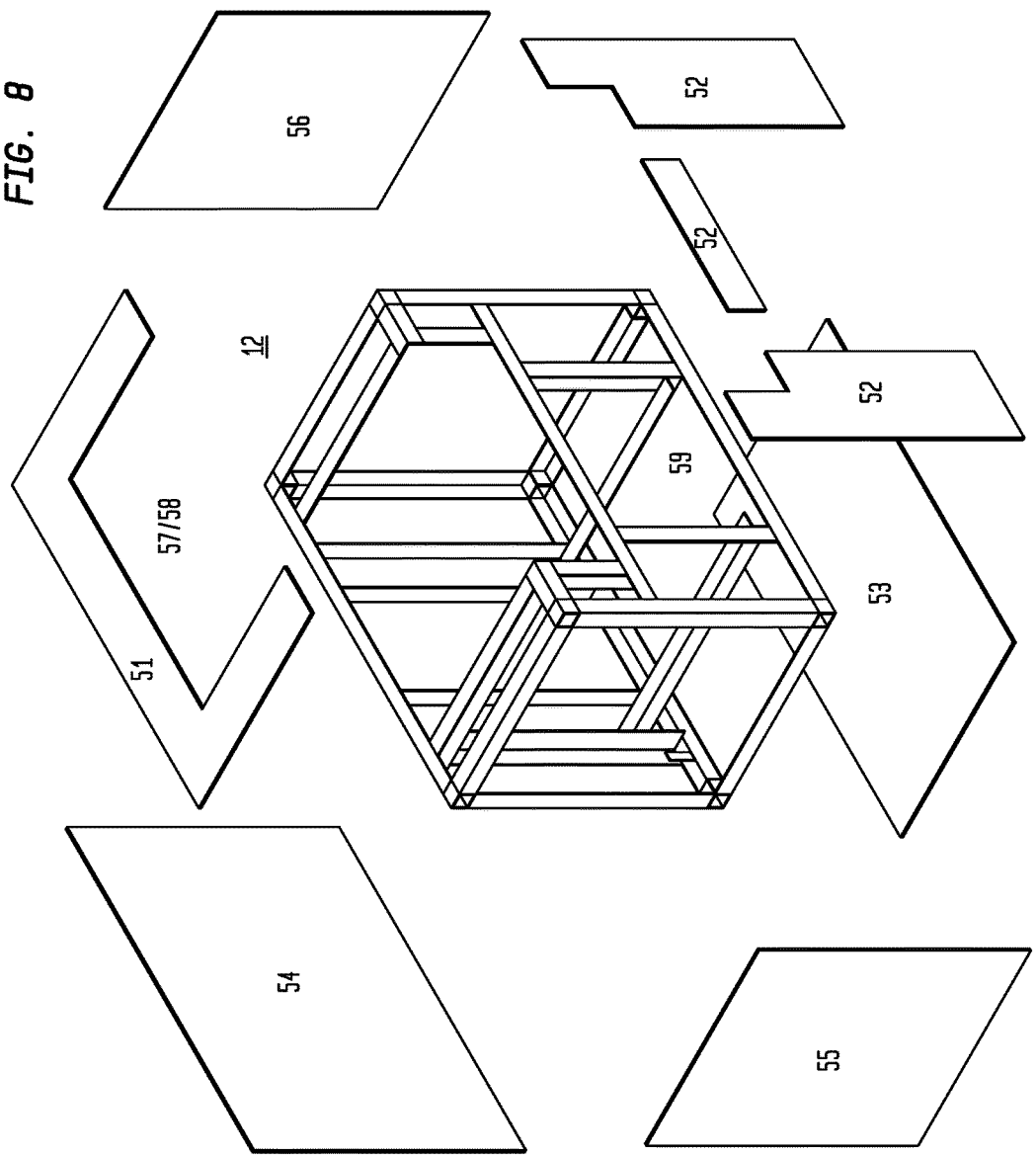

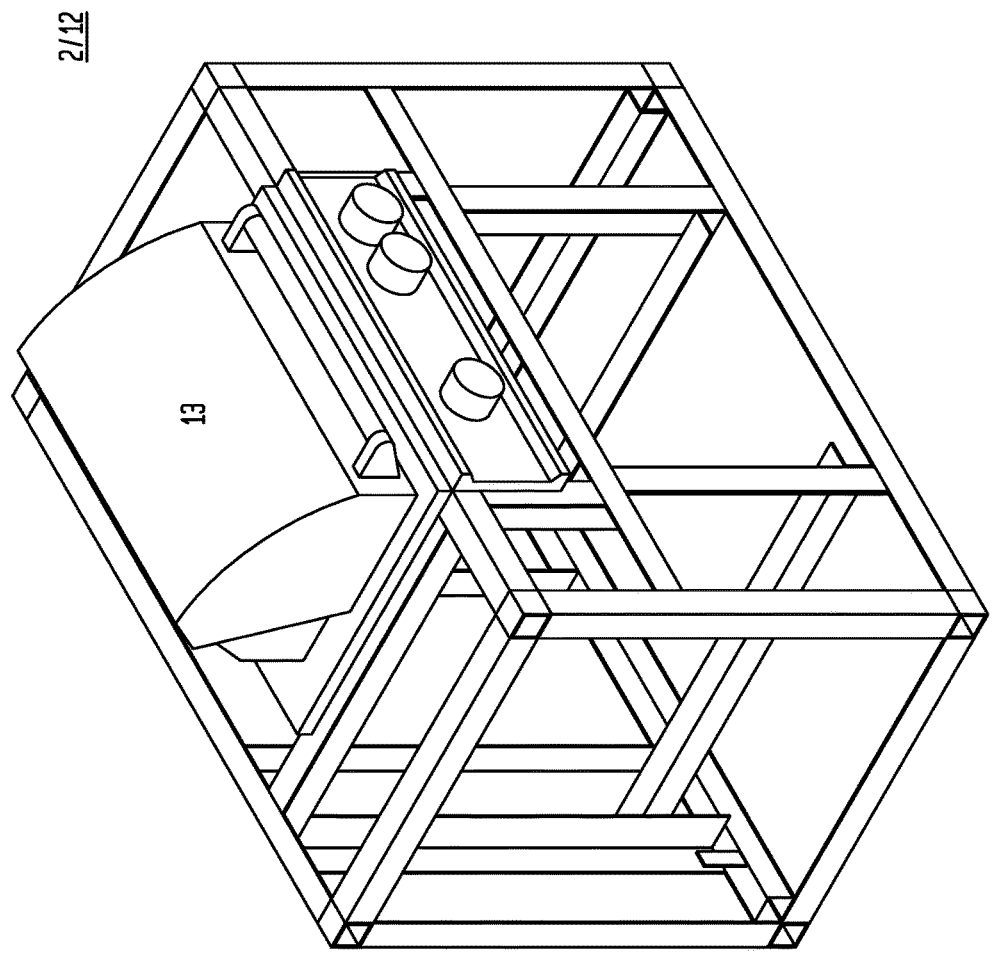

GRILL INSERT ENCLOSURE

I. FIELD OF THE INVENTION

A grill insert enclosure including a framework including a pair of frame ends disposed in opposed relation by a plurality of frame members, a pair of support members, each having a first portion joined to a second portion configured to adjustably locate the first portion in relation to a top rear cross member and a top front cross member and adjustably locate the second portion in relation to a top front cross member and a front medial cross member to define a removable portion of the top front cross member, which upon removal results in a support frame tailored to supportingly engage any one of a numerous and wide variety of differently configured or dimensioned grill inserts.

II. BACKGROUND

Conventional grill inserts can substantially vary in configuration and dimensions. Accordingly, these variations necessitate production of a plurality of support structures each having different fixed dimensions to accommodate each of the different configurations of grill inserts.

There would be a substantial advantage in a grill insert enclosure that allows ready, on-site adjustment to provide a support frame adaptable to receive any one of a plurality of differently configured and dimensioned grill inserts.

III. SUMMARY OF THE INVENTION

A broad object of particular embodiments of the invention can be to provide a grill insert enclosure including a framework of interconnected frame members having a first end frame opposite a second end frame, one or more of a top rear cross member, a top front cross member, bottom rear cross member, bottom front cross member, and a front medial cross member, and a pair of support members adjustably positionably securable in relation to at least two of the cross members to variably define a removable portion of the framework disposed between the pair of support members, which upon removal provides a support frame adapted to support any one of a plurality of differently configured and dimensioned grill inserts. The pair of support members can, but need not necessarily, include a first portion joined to a second portion, the first portion configured to adjustably position in relation to a top rear cross member and top front cross member of the framework, and the second portion configured to adjustably position in relation to the top front cross member and the front medial cross member of the framework to define between the pair of support members a removable portion of the top front cross member to provide a support frame for the grill insert. The support members, having incremental positional adjustment in relation to the cross members, can define a removable portion of the cross members resulting in a correspondingly incrementally adjustable support frame adapted to support grill inserts having any one of a plurality of different configurations and dimensions.

Another broad object of particular embodiments of the invention can be a kit for making a grill insert enclosure by providing a plurality of frame members, interconnectable, to generate a framework having a first end frame and a second end frame and providing a plurality of cross members having cross member first ends opposite cross member second ends, the plurality of cross members joinable to said first end frame and said second end frame to dispose said first end frame opposite said second end frame, and providing a pair of support members adjustably positionally secureable to two or more cross members to define a removable portion of the framework, and excising the removable portion of the framework to provide a support frame adapted to supportingly engage a grill insert. The kit can, but need not necessarily include, providing the pair of support members each having a first portion joined to a second portion, the first portion secureable to a top rear cross member and a top front cross member, the second portion securable to the top front cross member and a front medial cross member to define a removable portion of the top front cross member, whereby excising the removable portion of said top front cross member defined by the pair of support members defines a support frame adapted to supportingly engage a grill insert. Thus, incrementally positionally adjusting the support members, in relation to the cross members, results in a correspondingly incrementally adjustable support frame adapted to support grill inserts having any one of a plurality of different configurations and dimensions.

Another broad object of particular embodiments of the invention can be a method for making a grill insert enclosure including a framework having a support frame incrementally adjustable to support grill inserts having any one of a plurality of different configurations and dimensions. The method can include one or more of interconnecting a plurality of frame members to generate a first end frame and a second end frame, correspondingly joining cross member first ends and cross member second ends of a plurality of cross members to said first end frame opposite said second end frame, adjustably positioning a pair of support members in spaced apart relation to at least two cross members, securing the pair of support members to at least two cross members, and excising a removable portion of the framework resulting in a support frame adapted to supportingly engage a grill insert. The method can, but need not necessarily, include adjustably positionally securing a first portion of the pair of support members in spaced apart relation to a top rear cross member and a top front cross member and adjustably positionally securing a second portion of the pair of support members in spaced apart relation to the top front cross member and a front medial cross member, the pair of support members secured to the top front member and the front medial cross member defining a removable portion of the top front cross member, resulting in a support frame adapted to supportingly engage a grill insert.

Naturally, further objects of the invention are disclosed throughout other areas of the specification, drawings, photographs, and claims.

IV. BRIEF DESCRIPTION OF THE DRAWINGS

FIG. 8 is an exploded front perspective view of a particular embodiment of the first and second end frames, cross members, support members, removed portion of the top front cross member, drawer members, and panels.

FIG. 9 is a front perspective view of a particular embodiment of the first and second end frames, cross members, support members, removed portion of the top front cross member, drawer members, and grill insert.

V. DETAILED DESCRIPTION OF THE INVENTION

Figure 1:
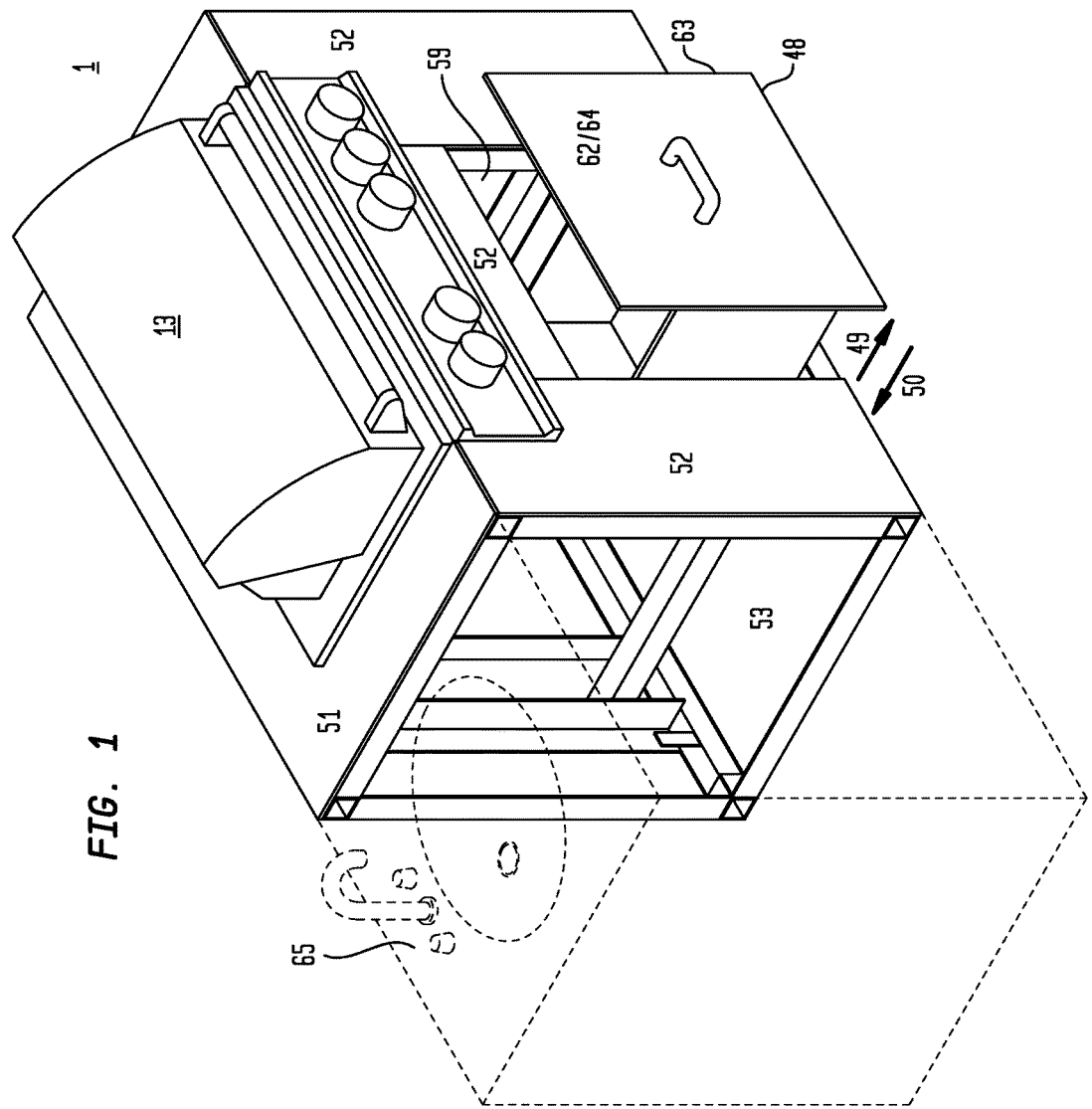
FIG. 1 is a front perspective view of an embodiment of a grill insert enclosure.

Illustrated in FIGS. 1-9, and further described herein, are particular embodiments of a grill insert enclosure (1), including a framework (2) having a pair of frame ends (3) disposed in opposed relation by a plurality of cross members (4), and a pair of support members (5), each of the pair of support members (5) having a first portion (6) joined to a second portion (7) configured to adjustably locate the first portion (6) in relation to a top rear cross member (8) and a top front cross member (9) and adjustably locate the second portion (7) in relation to a top front cross member (9), and a front medial cross member (10) to define a removable portion (11) of the top front cross member (9), which upon removal results in a support frame (12) tailored to supportingly engage any one of a numerous and wide variety of differently configured or dimensioned grill inserts (13).

Figure 2:
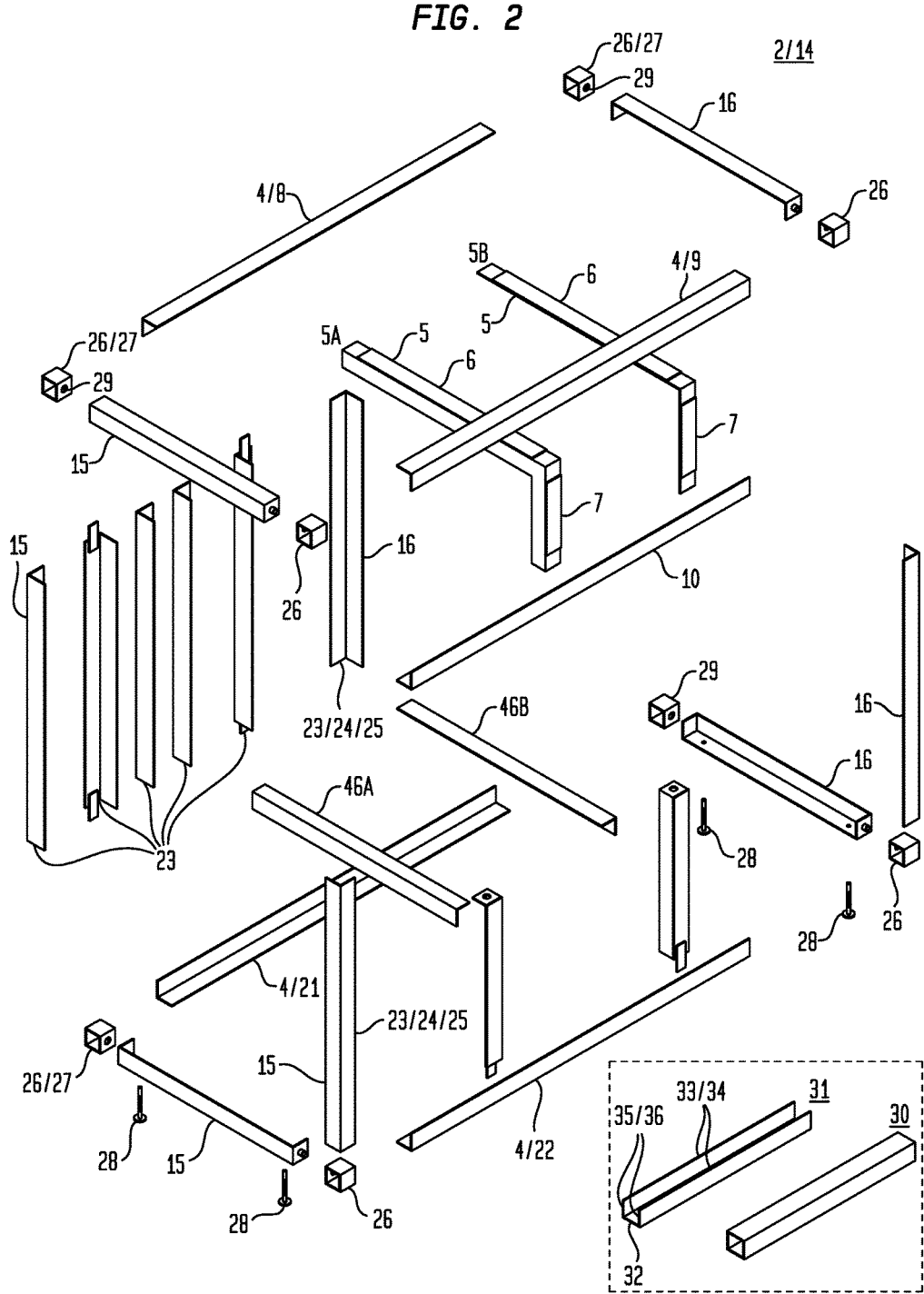
FIG. 2 is an exploded view of a particular embodiment of a grill insert enclosure and the framework including frame members, cross members, and support members.

Referring primarily to FIG. 2, particular embodiments of the grill insert enclosure (1) can include a plurality of frame members (14), interconnected or interconnectable, to provide a framework (2) which can be variably adjusted to supportingly engage a grill insert (13). As to particular embodiments, the frame members (14) can include a plurality of first end frame members (15) and a plurality of second end frame members (16) each having a length disposed between first and second end frame member ends (17) (18), interconnectable to provide a first end frame (19) and a second end frame (20) respectively. The frame members (14) can further include one or more of: a top rear cross member (8), a top front cross member (9), a bottom rear cross member (21), a bottom front cross member (22), and a front medial cross member (10), each having a length disposed between first and second frame member ends (17) (18) joinable to the first end frame (19) and the second end frame (20) to dispose the first and second frame ends (19) (20) a distance apart. The frame members (14) can further include a pair of support members (5A) (5B) each having a first portion (6) joined to a second portion (7), each first portion (6) positionally securable to the top rear cross member (8) and said top front cross member (9) between the first end frame (19) and the second end frame (20), and the second portion (7) positionally securable to the top front cross member (9) and the front medial cross member (10) between the first end frame (19) and the second end frame (20). The frame members (14) can, but need not necessarily be, metal angles (23) having first and second legs (24) (25) joined in substantially orthogonal relation and terminating in securement ends (26) (shown in the illustrative example of FIG. 2 as open ended square tubes (27) joined to the metal angles (23) by mechanical fasteners (28), and further including an aperture (29) on an adjoining side for receiving mechanical fasteners (28) configured to allow interconnection of the first and second end frame members (15) (16)) to provide the first and second end frames (19) (20) and to allow interconnection of the cross members (4) with the first and second end frames (19) (20) to dispose the first and second end frames in opposed relation a distance apart. While the frame members (14) are generally shown in the Figures as metal angles (23); this is not intended to preclude embodiments having frame members (14) configured as open-ended tubes (30) (whether square, rectangular, circular, oval, or otherwise in orthogonal cross section), open sided channels (31) having a base (32) (or web) joined between a pair of legs (33) (34) extending outward in orthogonal relation from a first or second side (35) (36) (or both) of the base (32) (or web), solid rods (whether square rectangular, circular, oval or otherwise) in orthogonal cross section or like configurations. The mechanical fasteners (28) can be discrete from, removably joined, or joined to the first end, second end, or both, of the plurality of frame members. The securement ends (26) (as shown in the illustrative example of FIG. 2) can be utilized by inserting one end of a frame member (14) into the open side of the open-ended square tube (27) of the securement end (26) and securing an adjoining frame member (14) with a mechanical fastener (28) received through the aperture (29). The mechanical fasteners (28) can, as illustrative examples, be screws, cam-screw systems, nuts and bolts, or other like mechanical fasteners; however, this is not intended to preclude securement by friction fit, telescoping engagement, adhesive, welding, or the like, or combinations thereof. The frame members (14), securement ends (26), and mechanical fasteners (28) can be: metal, metal alloys, plastics, or other like rigid materials, or combinations thereof, which will not substantially deform, warp, bend or melt when exposed to temperatures during normal use of a grill insert (13). As to particular embodiments, the framework (2) can be provided as a self-assembly kit of members interconnectable in whole or in part in situ. As to particular embodiments, the first and second end frames (19) (20) can, but need not necessarily, be provided as one-piece constructs. Additionally, while the Figures generally depict the first and second end frames (19) (20) as square or rectangular; this is not intended to preclude embodiments in which the first and second end frames (19) (20) can be configured as a pentagon, a hexagon, a septagon, an octagon, or other geometric configuration. Moreover, while the first and second end frames (19) (20) are generally shown as being substantially planar; this is not intended to preclude embodiments in which the first and second end frames (19) (20) include substantially linear frame end members (15) (16) rotated or out of planar relation, or include one or more frame end members (15) (16) which are not linear, but are angulated, arcuate, or otherwise not linear between terminal ends of the frame end members (17) (18).

Figure 3:
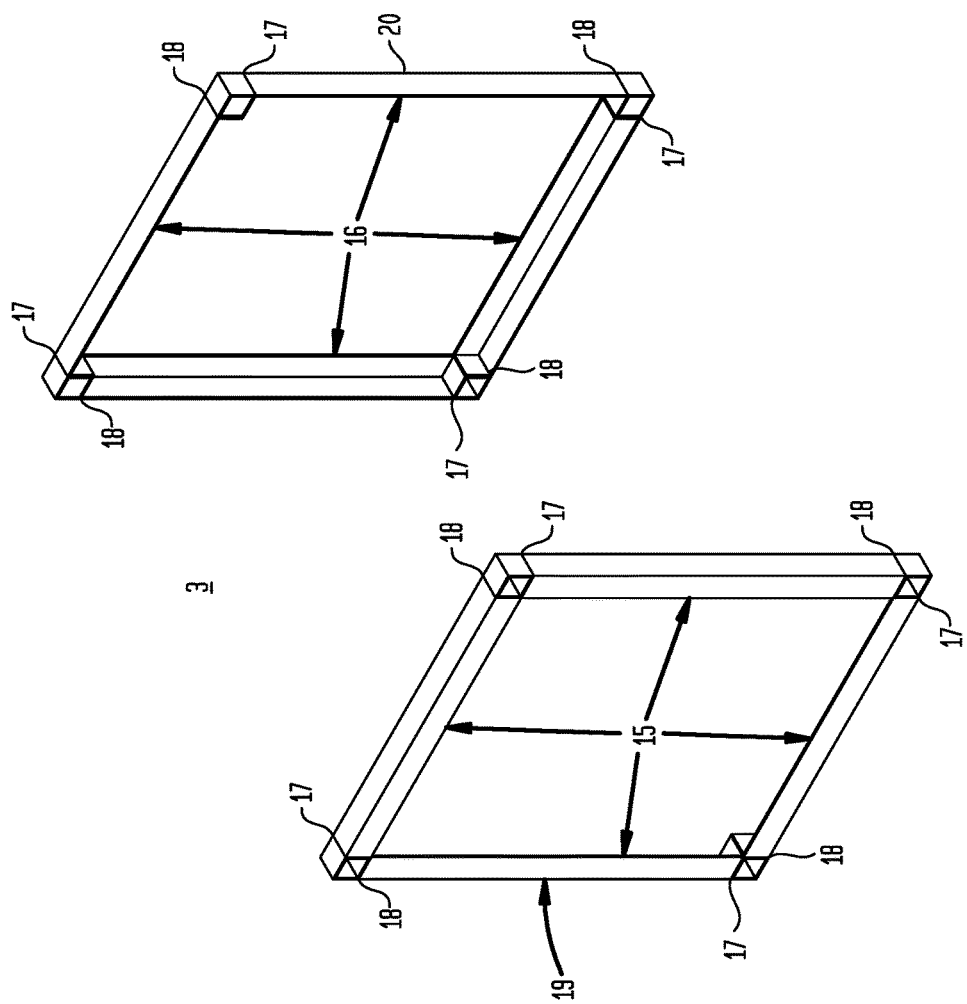
FIG. 3 is a front perspective view of a particular embodiment of the first and second end frames.

Now referring primarily to FIG. 3, as to particular embodiments, the grill insert enclosure (1) can be constructed by interconnecting the plurality of first end frame members (15) to provide a first end frame (19) and by interconnecting the plurality of second end frame members (16) to provide the second end frame (20). The first and second end frames (19) (20) can be disposed in opposed relation a distance apart. As to particular embodiments, the first end frame (19) can be disposed opposite the second end frame (20) (as shown in the example FIG. 3). Placement of the first end frame (19) opposite a second end frame (20) can, but need not necessarily, include disposing the first and second frame ends (19) (20) in substantially parallel relation; however as to other embodiments, the first and second end frames (19) (20) can be disposed in angulated relation disposing the tops of the first and second end frames (19) (20) at a greater or lesser distance apart than the bottoms of the first and second end frames (19) (20), and similarly, the fronts of the first and second end frames (19) (20) can be disposed at a greater or lesser distance apart than the backs of the first and second end frames, or combinations thereof.

Figure 4:
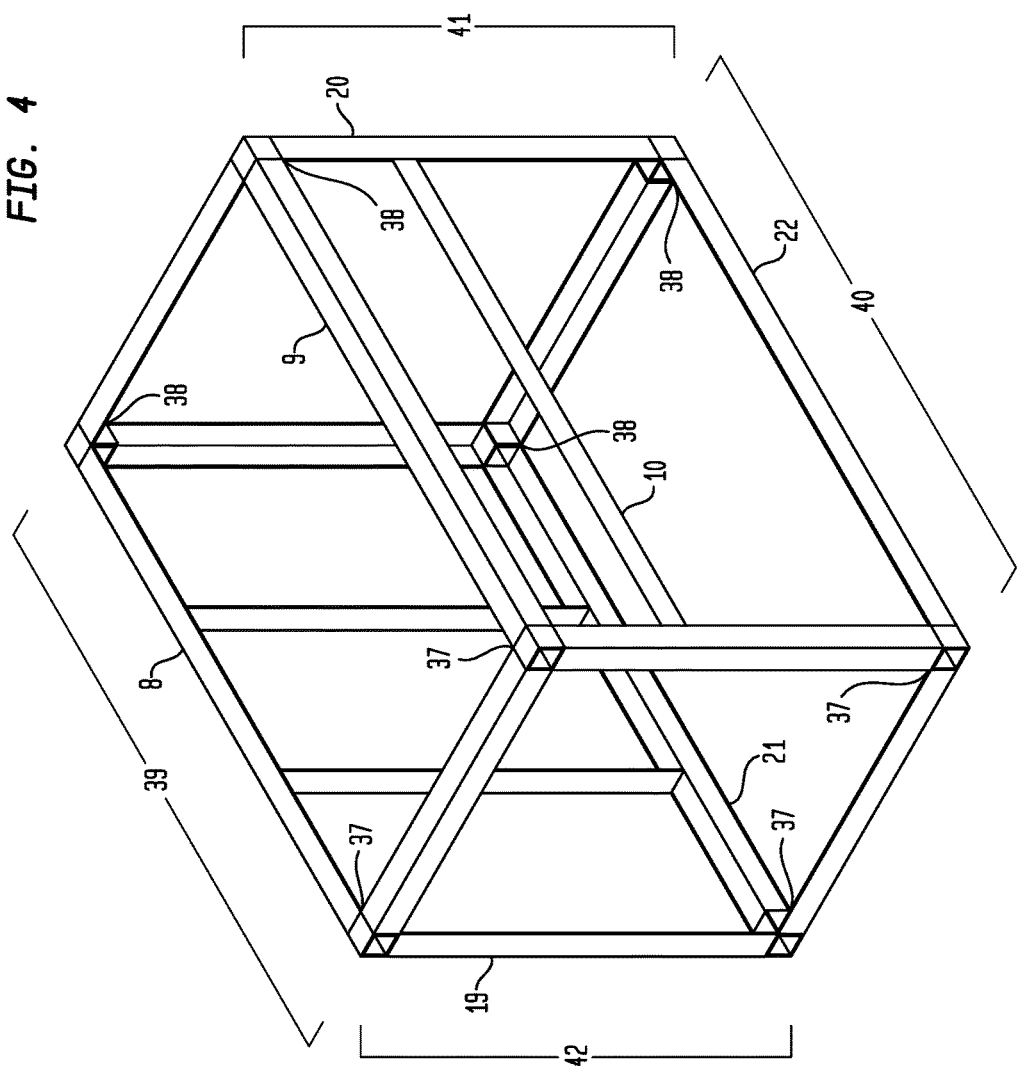
FIG. 4 is a front perspective view of a particular embodiment of the first and second end frames and cross members.

Now referring primarily to FIG. 4, the framework (2) can be further constructed by disposing a top rear cross member (8), a top front cross member (9), a bottom rear cross member (21), bottom front cross member (22), and a front medial cross member (10) (or additional cross members as to embodiments which have first and second frame ends (19) (20) which are not square or rectangular or in which the framework (2) does not define a square or rectangular volume) between the first and second end frames (19) (20), and securing in immovable fixed relation each of the plurality of cross member first ends (37) to the first end frame (19), as well as the cross member second ends (38) to the second end frame (20). A top frame (39) of the framework (2) can be defined by the top rear cross member (8) and the top front cross member (9) interconnected to the first and second end frames (19) (20). A bottom frame (40) of the framework (2) can be defined by the bottom rear cross member (21) and the bottom front cross member (22) interconnected to the first and second end frames (19) (20). The top front cross member (9) and the bottom front cross member (22) interconnected to the first and second end frames (19) (20) can define a front frame (41) of the framework (2). The top rear cross member (8) and bottom rear cross member (21) interconnected with the first and second end frames (19) (20) can define a back frame (41). In particular embodiments, additional cross members (4) can, but need not necessarily, be secured to the first end frame (19) and second end frame (20) to define additional sub-frames, and particularly in those embodiments in which the framework (2) does not define a square or rectangular volume. Securement of the plurality of cross members (4) can be achieved as described above described by mechanical fasteners (28) and discrete securement ends (26), friction fit, telescoping engagement, adhesive, welding, or the like, or combinations thereof.

Figure 5:
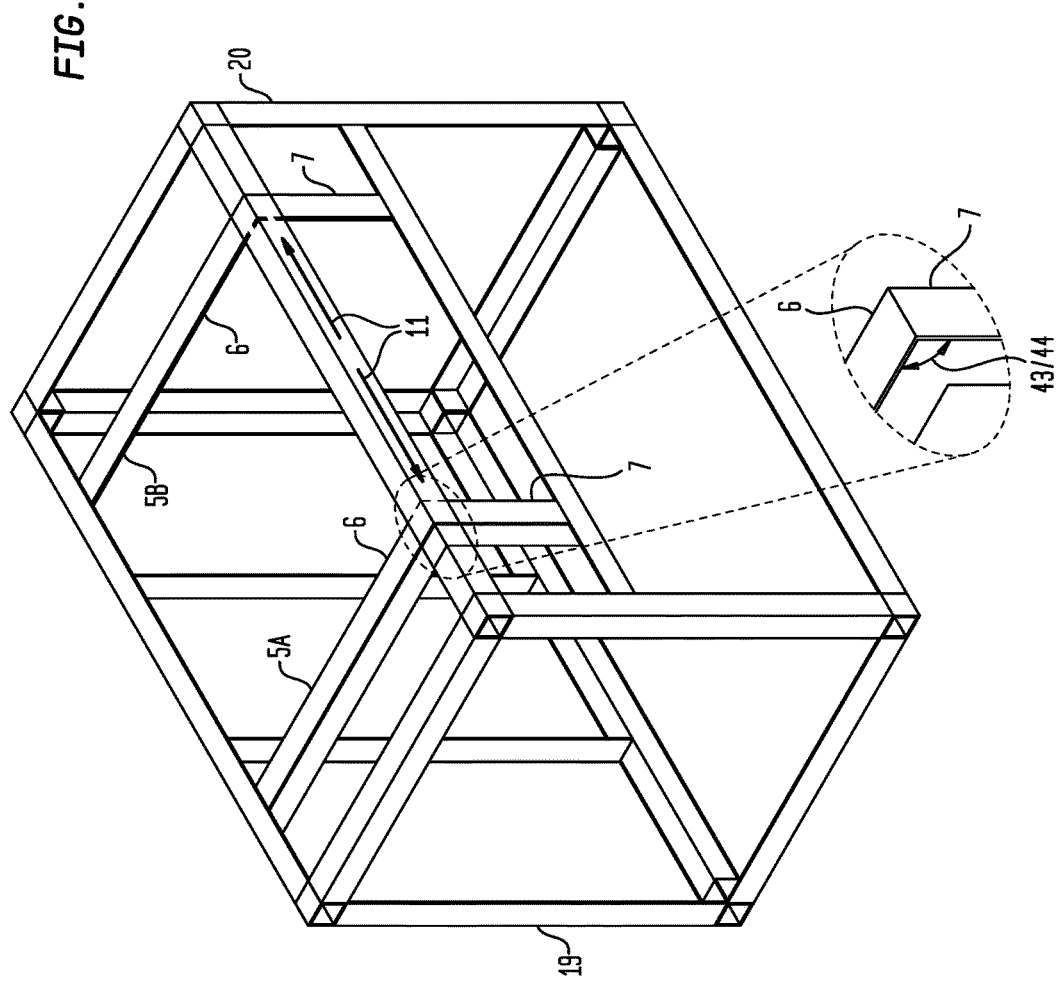
FIG. 5 is a front perspective view of a particular embodiment of the first and second end frames, cross members, and support members.

Now referring primarily to FIG. 5, embodiments can further include a pair of support members (5A) (5B), each having at least a first portion (6) joined to a second portion (7), which can be adjustably positionally located between the first end frame (19) and the second end frame (20) of the framework (2) to dispose the first support member (5A) and the second support member (5B) a distance apart allowing a grill insert (13) to be received between the pair of support members (5A) (5B), and which can provide a support frame (12) to supportingly engage the grill insert (13). The pair of support members (5A) (5B) can each be configured to allow the first portion (6) to be secured to the top rear cross member (8) and the top front cross member (9), and the second portion (7) to be secured to the top front cross member (9) and the front medial cross member (10).

As shown by the example of FIG. 5, the first portion (6) can be orthogonally joined to the second portion (7) to generally define a right angle (43); however, as to particular embodiments, the angle (44) defined by the first portion (6) joined to the second portion (7) can be obtuse or acute, depending on the overall configuration of the framework (2) of interconnected members in relation to the configuration and dimensions of the grill insert (13). The angle (44) defined by the first and second portion (6) (7) of each of the pair of support members (5A) (5B) can be selected from a range of angles including, consisting essentially of, or consisting of about 45 degrees to about 135 degrees. The angle (44) defined by the first and second portion of each support member can be selected from the group including or consisting of: about 45 degrees to about 55 degrees, about 50 degrees to about 60 degrees, about 55 degrees to about 65 degrees, about 60 degrees to about 70 degrees, about 65 degrees to about 75 degrees, about 70 degrees to about 80 degrees, about 75 degrees to about 85 degrees, about 80 degrees to about 90 degrees, about 85 degrees to about 95 degrees, about 90 degrees to about 100 degrees, about 95 degrees to about 105 degrees, about 100 degrees to about 110 degrees, about 105 degrees to about 115 degrees, about 110 degrees to about 120, about 115 degrees to about 125 degrees, about 110 degrees to about 120 degrees, about 115 degrees to about 125 degrees, about 120 degrees to about 130 degrees, and about 125 degrees to about 135 degrees; however, the pair of support members (5A) (5B) need not necessarily define the same angle (44) between the first and second portions (6) (7). Securement of each of the pair of support members (5A) (5B) may be achieved as described above by mechanical fasteners (28) and discrete securement ends (26), friction fit, telescoping engagement, adhesive, welding, or the like, or combinations thereof.

Figure 6:
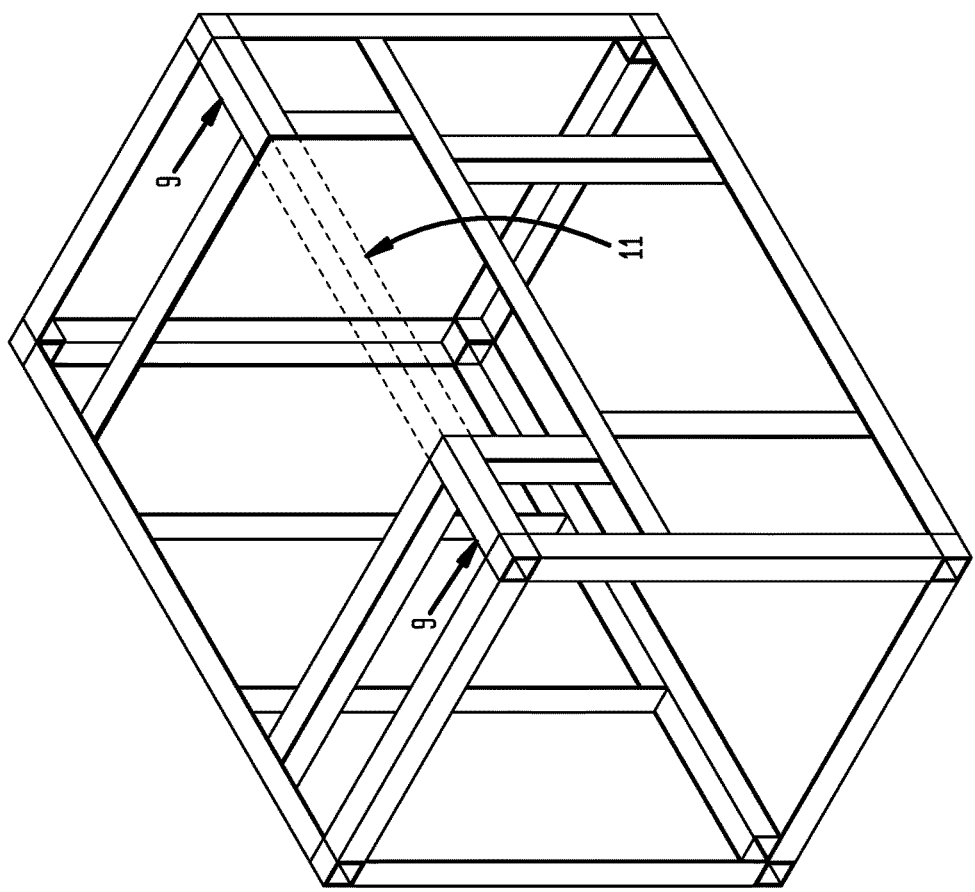
FIG. 6 is a front perspective view of a particular embodiment of the first and second end frames, cross members, support members, and removed portion of the top front cross member.

Now referring primarily to FIG. 6, a removable portion (11) of the top front cross member (9) can be defined by the distance between the pair of support members (5A) (5B). A support frame (12) for the grill insert (13) can be generated by excising the removable portion (11) of the top front cross member (9). Excision of the removable portion (11) of the top front cross member (9) can be accomplished with a saw, torch, shears, water jet, or other cutting tool, depending upon whether the framework (2) is assembled in situ or as part of a stepwise manufacturing process.

Figure 7:
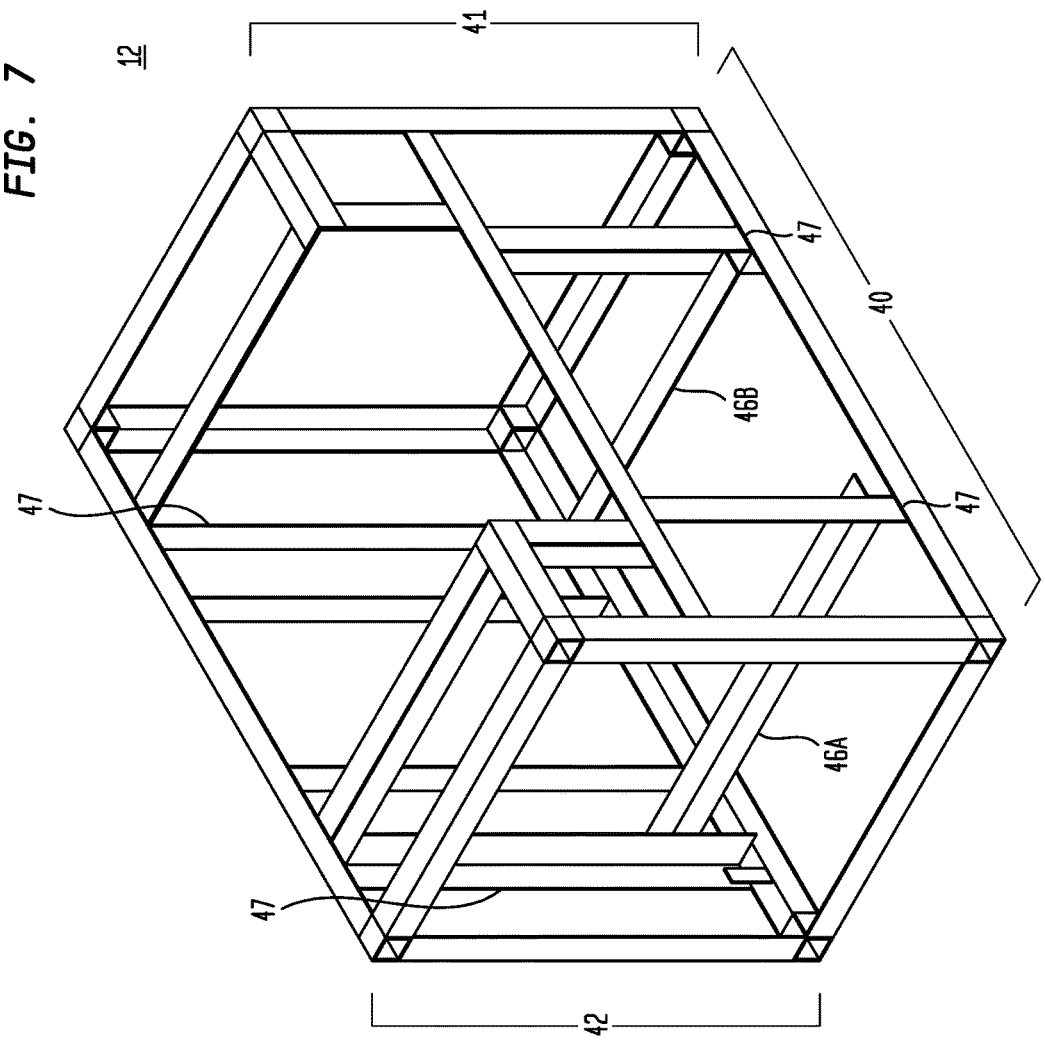
FIG. 7 is a front perspective view of a particular embodiment of the first and second end frames, cross members, support members, removed portion of the top front cross member, and drawer members.

Now referring primarily to FIG. 7, as to particular embodiments, the grill insert enclosure (1) can, but need not necessarily, further include a drawer or a plurality of drawers (45). As to a particular embodiment shown in the example of FIG. 7, a pair of drawer support members (46A) (46B) can be interconnected with generally vertical support members (47) disposed in the front frame (41) and the back frame (42) in a generally linear parallel relation at substantially the same height above the bottom frame (40). The pair of drawer support members (46A) (46B) can be interconnected to the vertical support members (47) as described above by mechanical fasteners (28) and discrete securement ends (26), friction fit, telescoping engagement, adhesive, welding, or the like, or combinations thereof. As shown in the example of FIG. 1, a drawer box (48) can be configured to slidingly engage the pair of drawer support members (46A) (46B) to allow the drawer box (48) to travel from an open condition (49) to a closed condition (50) in relation to the framework (2) of the grill insert enclosure (1). Additional vertical support members (47) and drawer supports (46A) (46B) can, but need not necessarily, be included depending on the configuration, dimensions, and numbers of drawers (44). As to particular embodiments, the drawer box (48) can further include plastic friction slides secured to the surface of the drawer box (48) that engages the pair of drawer support members (46A) (46B), roller slides, bearing slides, or the like.

Now referring primarily to FIG. 8, as to particular embodiments, the grill insert enclosure (1) can, but need not necessarily, further include one or more of: a top panel (51), front panel (52), bottom panel (53), back panel (54), and first or second end panels (55) (56), or any combination thereof, secured to the framework (2). The top panel (51) can be configured to include a top panel pass-through (57) which defines a top opening (58) through which a grill insert (13) can pass in order to supportingly engage the support frame (12), provided as above described, when secured to the top frame (39) of the framework (2). The top panel (51), the back panel (54), the front panel (52), the bottom panel (53), or the first or second end panels (55) (56) can be secured to the framework (2) by mechanical fasteners (28), adhesives, or the like. The front panel (52), the back panel (54), or first or second end panels (55) (56)) can, but need not necessarily, include a drawer aperture (59) (as shown in the example of FIG. 8) to permit the drawer (45) to travel from an open condition (49) to a closed condition (50) (as shown in the example of FIG. 1) in relation to the framework (2). The drawer box (48) can be slidingly engaged with the pair of drawer support members (46A) (46B), and can travel through the drawer aperture (59). As to particular embodiments, the front panel (52) can further include a drawer panel (62) which affixes to the drawer box (48). The drawer panel (62) can have a peripheral edge (63) defining a drawer panel face (64), which in the closed condition (61) of the drawer (45), resides within the drawer aperture (59) and substantially flush with the front panel (52). The top panel (51), bottom panel (53), front panel (52), back panel (54), first and second end panels (55) (56), can each, but need not necessarily, be one-piece of a sheet of material which can further include apertures, vents, slots, or other pass through elements.

Now referring primarily to FIG. 9, a grill insert (13) can be supportingly received in the support frame (12) of the framework (2) of the grill insert enclosure (1) (shown in the example of FIG. 9 without top, bottom, front, back or end panels above-described and shown in the example of FIG. 1 with top, bottom, front, back or end panels) to supportingly engage a grill insert (13). The grill insert can, as illustrative examples, be one or more of: a charcoal grill, gas grill, smoker grill, electronic grill, or combination thereof.

Again referring primarily to FIG. 1, particular embodiments, of the grill insert enclosure (1) can be configured without first or second end panels (55) (56) to allow additional grill insert enclosures (1) or other mateably configured enclosures (65) (as shown in broken line) to be joined to either the first or second end frames (19) (20).

As can be easily understood from the foregoing, the basic concepts of the present invention may be embodied in a variety of ways. The invention involves numerous and varied embodiments of and methods for making and using such a grill insert enclosure including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "a framework of interconnected frame members" should be understood to encompass disclosure of the act of "interconnecting frame members of a framework"—whether explicitly discussed or not—and, conversely, were there effectively disclosure of the act of "interconnecting frame members framework", such a disclosure should be understood to encompass disclosure of a "a framework of interconnected frame members" and even a "means for interconnecting frame members of a framework." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the grill insert enclosures herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An enclosure to support a grill, comprising:
a framework of interconnected metal frame members, including:
first and second generally rectangular end frames, each said end frame including front and rear upright members interconnecting an end frame top member disposed opposite an end frame bottom member;
a plurality of cross members joining said first and second generally rectangular end frames, said plurality of cross members including:
a top rear cross member and a top front cross member joining said first and second end frame top members defining an enclosure top frame;
a bottom rear cross member and bottom front cross member joining said first and second end frame bottom members defining an enclosure bottom frame;
said top front cross member and said bottom front cross member joining said first and second end frame front upright members defining an enclosure front frame;
said top rear cross member and said bottom rear cross member joining said first and second end frame rear upright members defining an enclosure back frame;
a front medial cross member joining said first and second end frame front upright members, said medial cross member disposed directly between said top front cross member and said bottom front cross member;
a pair of support members securable in adjustably spaced relation between said first and second generally rectangular end frames based on dimensions of said grill, each of said pair of support members having a first portion joined in angled relation to a second portion, said first portion secures to said top rear cross member and said top front cross member between said first and second end frame top members, said second portion secures to said top front cross member and said front medial cross member between said first and second end frame front upright members, wherein securement of said first and second portion of said pair of support members adjustably spaced between said first and second generally rectangular end frames based on dimensions of said grill defines a length of a removable portion of said top front cross member, whereby upon removal of said length of said removable portion of said top front cross member said pair of support members define a support frame to supportingly engage said grill.

2. The enclosure of claim 1, wherein said first and second portion of said pair of support members join at an angle occurring in a range of about 45 degrees to about 135 degrees.

3. The enclosure of claim 2, wherein said first and second portion of said pair of support members join at an angle selected from the group consisting of about 45 degrees to about 55 degrees, about 50 degrees to about 60 degrees, about 55 degrees to about 65 degrees, about 60 degrees to about 70 degrees, about 65 degrees to about 75 degrees, about 70 degrees to about 80 degrees, about 75 degrees to about 85 degrees, about 80 degrees to about 90 degrees, about 85 degrees to about 95 degrees, about 90 degrees to about 100 degrees, about 95 degrees to about 105 degrees, about 100 degrees to about 110 degrees, about 105 degrees to about 115 degrees, about 110 degrees to about 120, about 115 degrees to about 125 degrees, about 110 degrees to about 120 degrees, about 115 degrees to about 125 degrees, about 120 degrees to about 130 degrees, and about 125 degrees to about 135 degrees.

4. The enclosure of claim 3, further comprising a top panel secured to said top frame, said top panel having a top panel pass-through defining a top opening through which said grill insert passes to engage said support frame.

5. The enclosure of claim 4, further comprising a front panel secured to said front frame, said front panel having a front panel pass-through defining a front opening through which said grill insert passes to engage said support frame.

6. The enclosure of claim 5, further comprising a pair of drawer support members interconnected to said front frame and said back frame in generally linear parallel relation at a height above said bottom frame; a drawer slidingly engaged with said pair of drawer support members, said front panel having a drawer aperture through which said drawer passes to travel outward of said front panel secured to said front frame.

7. The enclosure of claim 6, further comprising a grill insert supportingly engaged by said support frame.

8. A method of making an enclosure for supporting a grill, comprising:
providing a plurality of metal frame members interconnectable into a framework, including:
first and second generally rectangular end frames, each said end frame including front and rear upright members interconnecting an end frame top member disposed opposite an end frame bottom member;
a plurality of cross members to said first end frame and said second end frame to dispose said first end frame opposite said second end frame, said plurality of cross members including:
a top rear cross member and a top front cross member joining said first and second end frame top members defining an enclosure top frame;
a bottom rear cross member and bottom front cross member joining said first and second end frame bottom members defining an enclosure bottom frame;
said top front cross member and said bottom front cross member joining said first and second end frame front upright members defining an enclosure front frame;
said top rear cross member and said bottom rear cross member joining said first and second end frame rear upright members defining an enclosure back frame;
a front medial cross member joining said first and second end frame front upright members, said front medial cross member disposed directly between said top front cross member and said bottom front cross member;
providing a pair of support members securable in adjustably spaced relation between said first and second generally rectangular end frames based on dimensions of said grill, each of said pair of support members having a first portion joined in angled relation to a second portion;
said first portion secureable to said top rear cross member and said top front cross member between said first and second end frame top members,
said second portion securable to said top front cross member and said front medial cross member between said first and second end frame front upright members;
wherein securement of said first and second portion of said pair of support members adjustably spaced between said first and second generally rectangular end frames based on dimensions of said grill defines a length of a removable portion of said top front cross member, whereby upon removing said length of said removable portion of said top front cross member between said pair of support members defines a support frame to supportingly engage said grill.

9. The method of claim 8, further comprising selecting an angle defined by said first and second portion of said pair of support members from a range of about 45 degrees to about 135 degrees.

10. The method of claim 9, further comprising selecting said angle defined by said first and second portion of said pair of support members from the group consisting of about 45 degrees to about 55 degrees, about 50 degrees to about 60 degrees, about 55 degrees to about 65 degrees, about 60 degrees to about 70 degrees, about 65 degrees to about 75 degrees, about 70 degrees to about 80 degrees, about 75 degrees to about 85 degrees, about 80 degrees to about 90 degrees, about 85 degrees to about 95 degrees, about 90 degrees to about 100 degrees, about 95 degrees to about 105 degrees, about 100 degrees to about 110 degrees, about 105 degrees to about 115 degrees, about 110 degrees to about 120, about 115 degrees to about 125 degrees, about 110 degrees to about 120 degrees, about 115 degrees to about 125 degrees, about 120 degrees to about 130 degrees, and about 125 degrees to about 135 degrees.

11. The method of claim 10, further comprising providing a top panel securable to said top frame, said top panel having a top panel pass-through defining a top opening through which said grill insert passes to engage said support frame.

12. The method of claim 11, further comprising providing a front panel securable to said front frame, said front panel having a front panel pass-through defining a front opening through which said grill insert passes to engage said support frame.

13. The method of claim 12, further comprising providing a pair of drawer support members interconnectable to said front frame and said back frame in generally linear parallel relation at a height above said bottom frame; a drawer slidingly engaged with said pair of drawer support members, said front panel having a drawer aperture through which said drawer passes to travel outward of said front panel secured to said front frame.

14. The method of claim 13, further comprising providing a grill insert supportingly engagable by said support frame.

15. A method of enclosure to support a grill comprising:
interconnecting a plurality of metal frame members provide a framework, including:
generating a first and second generally rectangular end frames, each end frame including front and rear upright members interconnecting an end frame top member disposed opposite an end frame bottom member;
correspondingly joining cross member first ends and cross member second ends of a plurality of cross members to said first and second end frames, said plurality of cross members including:
a top rear cross member and a top front cross member joining said first and second end frame top members defining an enclosure top frame;
a bottom rear cross member and bottom front cross member joining said first and second end frame bottom members defining an enclosure bottom frame;
said top front cross member and said bottom front cross member joining said first and second end frame front upright members defining an enclosure front frame;
said top rear cross member and said bottom rear cross member joining said first and second end frame rear upright members defining an enclosure back frame;
a front medial cross member joining said first and second end frame front upright members, said front medial cross member disposed directly between said top front cross member and said bottom front cross member;
adjustably spacing a pair of support members between said first and second generally rectangular end frames based on dimensions of said grill;

securing first portions of said pair of support members in spaced apart relation to said top rear cross member and said top front cross member between said first and second end frame top members;

securing second portions of said pair of support members in spaced apart relation to said top front cross member and said front medial cross member between said first and second end frame front upright members, said pair of support members secured to said top front cross member and said front medial cross member in spaced apart relation defining a length of a removable portion of said top front cross member; and removing said length of said removable portion of said top front cross member to define a support frame to supportingly engage said grill.

16. The method of claim 15, further comprising securing a top panel to said top frame, said top panel having a top panel pass-through defining a top opening through which said grill insert passes to engage said support frame.

17. The method of claim 16, further comprising securing a front panel to said front frame, said front panel having a front panel pass-through defining a front opening through which said grill insert passes to engage said support frame.

18. The method of claim 17, further comprising interconnecting a pair of drawer support members to said front frame and said back frame in generally linear parallel relation at a height above said bottom frame; a drawer slidingly engaged with said pair of drawer support members, said front panel having a drawer aperture through which said drawer passes to travel outward of said front panel secured to said front frame.

19. The method of claim 18, further comprising supportingly engaging said grill to said support frame.

\* \* \* \* \*